United States Patent [19]

Lewis, Jr.

[11] 4,016,579
[45] Apr. 5, 1977

[54] FLASH MOUNTING MEANS FOR CAMERA WITH FOLDING VIEWFINDER

[75] Inventor: John A. Lewis, Jr., Stoneham, Mass.

[73] Assignee: Polaroid Corporation, Cambridge, Mass.

[22] Filed: Apr. 21, 1975

[21] Appl. No.: 569,749

[52] U.S. Cl. ............................... 354/126; 240/1.3; 354/187; 354/219

[51] Int. Cl.² .................. G03B 15/03; G03B 13/02

[58] Field of Search ............. 354/126, 81, 82, 129, 354/145, 135, 293, 219, 224, 225, 158, 187; 339/59 L, 61 L, 154 L, 176 L; 240/1.3, 2 C

[56] References Cited

UNITED STATES PATENTS

| 3,559,548 | 2/1971 | Ackerman | 354/145 X |
|---|---|---|---|
| 3,757,643 | 9/1973 | Burgarello | 240/1.3 X |
| 3,783,760 | 1/1974 | Allen et al. | 354/225 X |
| 3,805,282 | 4/1974 | Erlichman | 240/1.3 |
| 3,836,933 | 9/1974 | Hochneiter | 354/187 |

FOREIGN PATENTS OR APPLICATIONS 1,119,398  7/1968  United Kingdom ............... 354/126

OTHER PUBLICATIONS

B383,465, Ellin, Jan. 1975, 240.1.3.

Primary Examiner—Edna M. O'Connor
Attorney, Agent, or Firm—John W. Ericson; John S. Vale

[57] ABSTRACT

Flash mounting apparatus for a camera having a folding viewfinder, comprising a socket mounted in the viewfinder cap for receiving a flash array, a spring for urging the viewfinder from a folded to an erect configuration, and a blade engaging member in the socket for engaging the blade of a flash array and holding it against accidental dislodgement when the viewfinder is erected.

4 Claims, 9 Drawing Figures

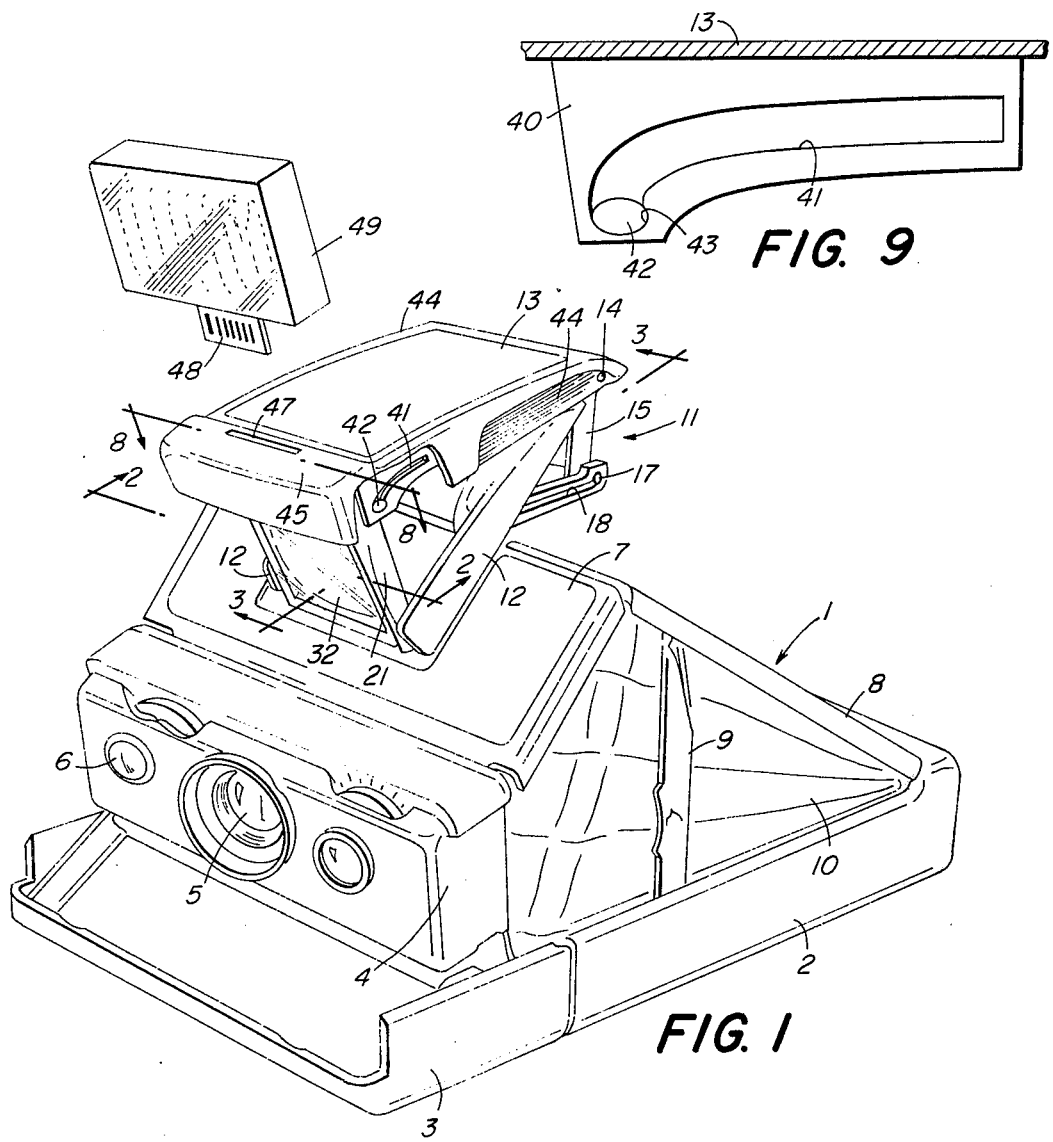
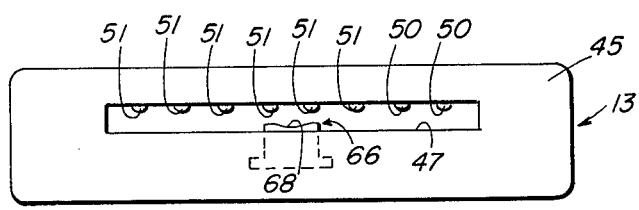

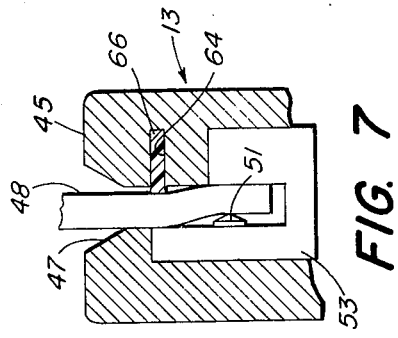
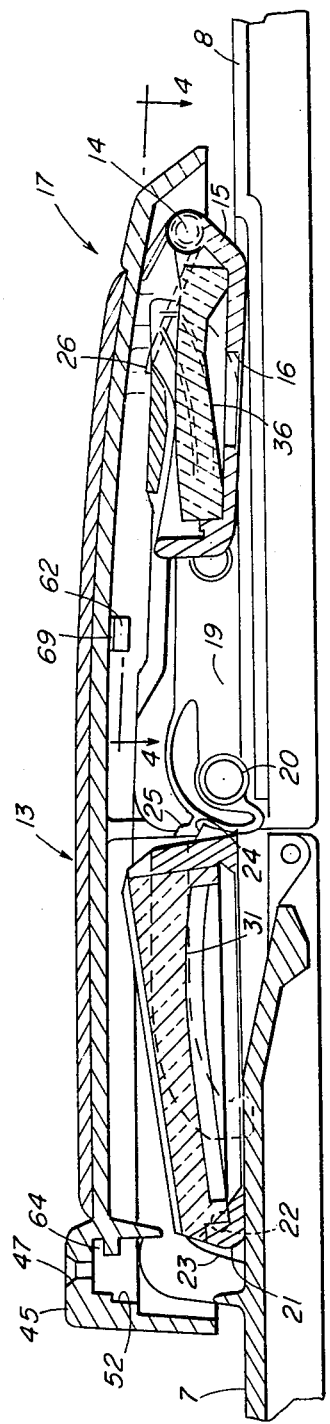
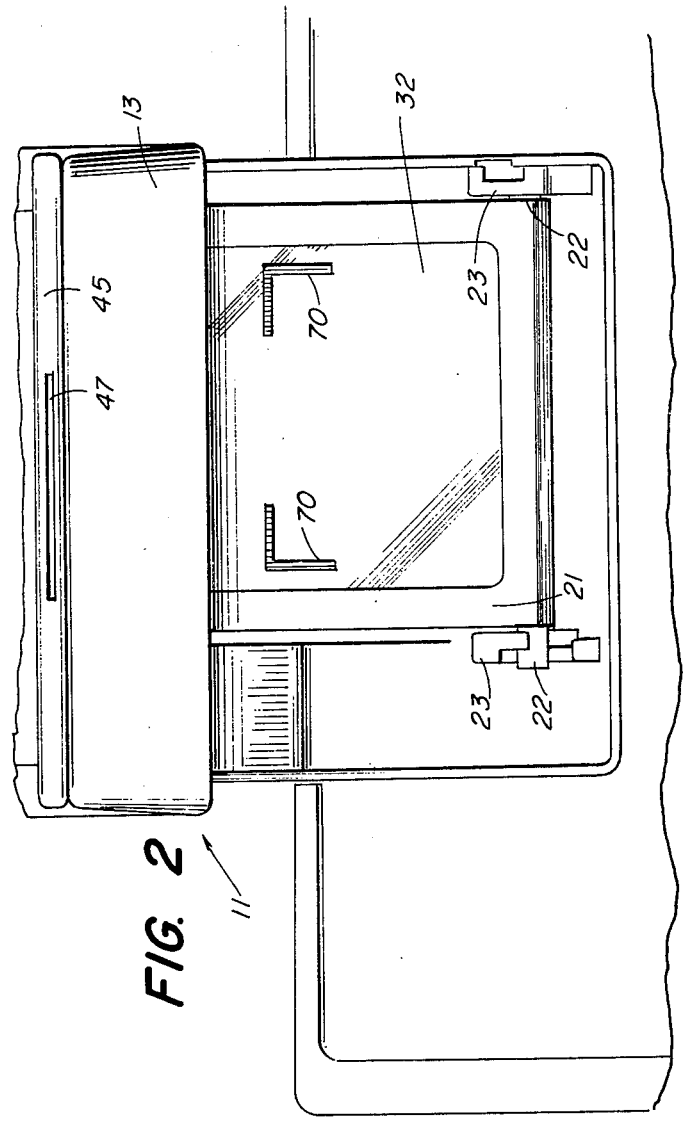

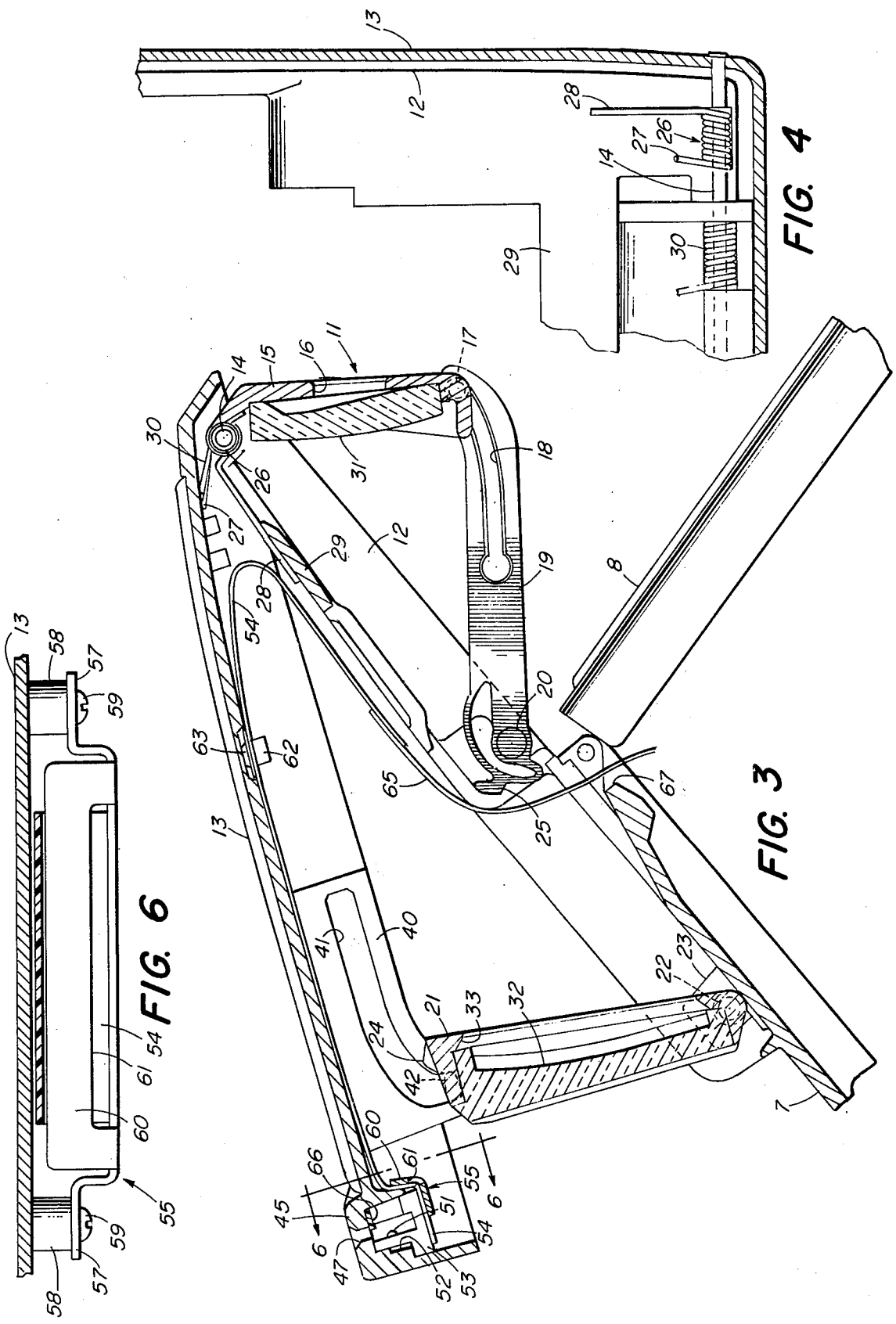

FLASH MOUNTING MEANS FOR CAMERA WITH FOLDING VIEWFINDER

This invention relates to photography, and particularly to a novel flash mounting array for a camera with a folding viewfinder.

The Polaroid SC-70 Land camera, as manufactured and sold by the Polaroid Corporation of Cambridge, Massachusetts is a highly automatic single lens reflex camera that is adapted to take flash photographs with the aid of flash arrays, such as the flash arrays made and sold by the General Electric Company. Such flash arrays comprise ten flashlamps, in two banks of five, formed with a blade for connection to a socket in the camera lensboard and shutter housing. Sequencing circuits in the camera select one flash bulb in the forward facing bank at a time for energization when the shutter button is pressed to take a flash photograph. Suitable apparatus for this purpose, and the general nature of the camera, the flash array, and the control circuits therefor, are shown, for example, in U.S. Pat. No. 3,820,128, granted on June 25, 1974 to John P. Burgarella, Peter C. Carcia and Richard C. Kee for Flash Photographic Control System and assigned to the assignee of this application.

The models of the Polaroid SX-70 Land camera currently made and sold include a through-the-lens viewing system comprising a folding viewfinder including an eye lens and a concave mirror. In the erect position of the viewfinder, this eyepiece magnifies a real aerial image of the scene to be photographed.

The aerial image is formed by a concave mirror communicating optically with the camera's objective lens through an entrance pupil on the top of the camera by way of an intermediate mirror. The intermediate mirror is formed on a reflex member that is movably mounted in the camera for movement between a viewing position and a taking position. This viewing system is more fully shown and described in U.S. Pat. No. 3,722,389, issued on Mar. 27, 1973, to Peter F. Costa and Edward H. Coughlin for Folding Camera and assigned to the assignee of this application.

It has been proposed to produce a simplified version of the Polaroid SX-70 Land camera in which the through-the-lens viewing system is replaced by a folding Galilean viewfinder, in essentially the same position as the through-the-lens viewfinder. Because such a viewfinder could not be used with the flash array mounted on top of the lensboard and shutter housing, it has been proposed to locate the flash socket on top of the viewfinder cap.

This general location for a flash unit is shown and described, for example, in U.S. Pat. No. 3,589,253, issued on June 29, 1971 to Irving Erlichman for Folding Camera and assigned to the assignee of this application. However, it has been found that when a flash bar is inserted in a socket so located, spring action occurring when the viewfinder is erected may throw the flash bar out of the socket.

One approach to the solution of this problem is to make the blade a tighter fit in the socket. However, this approach would require such tight tolerances on both blade and socket that it would be difficult to maintain them in practice, particularly when the flash array is made by one manufacturer and the camera by another.

A second approach would be to increase the contact pressure between the camera contacts and the blade contacts on the flash array. This solution would be electrically desirable, but mechanically undesirable because the camera contacts would have to be made stronger to exert the necessary pressure, and the wear on these contacts would be considerably accelerated.

It is the principal object of this invention to facilitate the mounting of a flash array on a spring-erected viewfinder without requiring high tolerances or unduly high contact pressures.

Briefly, the above and other objects of the invention are obtained by a novel flash mounting system which comprises a spring-erected folding Galilean viewfinder, a flash array engaging socket mounted in the cap of the viewfinder, and a blade engaging element in the socket arranged to resiliently engage the blade of a flash array and hold it securely in the socket without materially interfering with the action of the blade in its engagement with the contacts in the socket. In accordance with a particular embodiment of the invention, the erecting linkage is modified to include a detent that requires a greater force than needed to overcome the viewfinder erecting spring in order to collapse the viewfinder. This arrangement makes it possible to use a lighter viewfinder spring, and thereby further ameliorate the problem of unwanted ejection of the array.

The apparatus of the invention, and its mode of operation, will best be understood in the light of the following detailed description, together with the accompanying drawings, of an illustrative embodiment thereof.

In the drawings,

FIG. 1 is a schematic perspective sketch, comprising a three-quarter front view of a camera and flash array, in which the camera incorporates a flash mounting attachment in accordance with the invention;

FIG. 2 is a schematic front elevation of a fragment of the camera of FIG. 1, taken essentially along the lines 2—2 in FIG. 1, with parts broken away;

FIG. 3 is a schematic elevational sketch of the viewfinder of FIG. 1, on an enlarged scale, with parts shown in cross section and parts broken away, taken essentially along the lines 3—3 in FIG. 1;

FIG. 4 is a fragmentary schematic plan view of a portion of the viewfinder of FIGS. 1—3, with parts shown in cross section, parts omitted and parts broken away, and taken substantially along the lines 4—4 in FIG. 5;

FIG. 5 is a view corresponding to FIG. 3, but showing the viewfinder in its collapsed position, with parts shown in cross section and parts omitted;

FIG. 6 is a schematic view, on an enlarged scale, of a socket forming a portion of the apparatus of FIG. 3, taken substantially along the lines 6—6 in FIG. 3, with parts shown in cross section and parts broken away;

FIG. 7 is a schematic fragmentary diagrammatic sketch on an enlarged scale, illustrating the internal construction of a plug and socket in accordance with the invention, and its co-action with the blade of a flash array, being taken substantially along the lines 7—7 in FIG. 8; and FIG. 8 is a schematic plan view, on an enlarged scale, showing a portion of the viewfinder socket of the camera of FIG. 1, taken substantially along the lines 8—8 in FIG. 1, with parts omitted and parts schematically shown.

Referring first to FIG. 1, there is illustrated a camera 1, which may be a Polaroid SX-70 Land camera modified in the respects to be described, or any other suitable camera requiring a spring-erected viewing device with the optical and mechanical characteristics to be described. The camera has been shown only very generally, as it is of a well known, commercially available variety, and is well described elsewhere in the patent and other literature.

As suggested in FIG. 1, the camera 1 is of the folding variety comprising a main housing portion 2 hinged at the front to a bed 3 which can be dropped to facilitate loading the camera. A lensboard and shutter housing 4 is provided which may be identical with that of the Polaroid SX-70 Land camera except that it requires no flash bar socket. The taking lens of the camera is indicated at 5, and the shutter button at 6. The top front cover panel 7 is hinged at its forward end to the lensboard and shutter housing 4, and at its rear end to a rear top cover panel 8. The cover panel 8 is hinged to the main housing 2.

The camera is held in its erected position shown by means of an erecting link 9. When in the erected condition shown, a lighttight exposure chamber is formed between the elements just described, the camera's shutter, not shown, and a bellows 10, of flexible lighttight material. The camera so far described may be of any conventional design, but for example can be made from a Polaroid SX-70 Land camera by simply covering the exit pupil in the top cover panel 7 that was provided to communicate with the through-the-lens viewing system.

In place of that viewing system, there is shown a folding Galilean viewfinder generally designated 11.

Referring to FIG. 1, the viewfinder 11 is preferably made in the folding configuration generally similar to that shown in the above-cited U.S. Pat. No. 3,710,697. In particular, formed integrally with the forward top panel 7 are a pair of outstanding arms 12. A viewfinder cap 13 is pivotly mounted to the rear ends of the arms 12, by a pin suggested at 14 in FIGS. 1, 3 and 5.

The pin 14, on which the viewfinder cap is hinged to the arms 12, also serves to rotatably support an eye lens housing 15 formed with a rectangular viewing aperture 16 as seen in FIG. 3. Comparing FIGS. 1 and 3, the eye lens housing 15 is formed with posts 17 at its lowest corners which are received in guide slots 18 formed in arms 19 that are pivoted to the arms 12 as suggested at 20.

A generally rectangular objective lens housing 21 is formed with posts 22 at its lower corners which are pivoted in arms such as 23 formed integral with the panel 7. As indicated in FIGS. 2 and 3, the objective lens housing 21 may be provided with a projecting corner 24 on one side at the top for cooperation with a latch member 25 formed on one of the arms 19 to latch the viewfinder in its folded position.

As shown in FIGS. 3, 4 and 5, the viewfinder 11 is urged towards its erected position by a first spring 26 wound around the pin 14. The spring 26 has one end 27 engaging the viewfinder cap 13 and another end 28 engaging a lateral extension 29 formed integral with and bridging the arms 12, as shown in FIGS. 2 and 3.

The eyepiece is urged towards its erected position, as shown in FIG. 3, by a corresponding second spring 30, also wound about the pin 14, and acting between the eye lens housing 15 and the viewfinder cap 13.

An eye lens 31, comprising the positive element of a reversed Galilean system, is mounted in the eye lens housing 15. Similarly, an objective lens 32, comprising the negative element of a reversed Galilean system, is mounted in the objective lens housing 21. The details of these lenses form no part of this invention, and may be conventional. However, the particular form shown is desirable for its compactness, and is more fully described in U.S. Application for Letters Pat. Ser. No. 569,763, now Pat. No. 3,971,052, filed concurrently with this application by William T. Plummer for Compact Galilean Viewfinder and assigned to the assignee of this application.

A rectangular aperture 33 in the objective lens housing 21 defines a mask which is seen, somewhat out of focus, as the frame of the scene to be photographed. As is known, the degree of blur in the frame of a Galilean viewfinder is inversely proportional to the length of the viewfinder.

As indicated in FIGS. 1, 3 and 9, a pair of downwardly dependent ears 40 formed with guide slots 41 are formed integral with the viewfinder cap 13, and guidingly receive posts such as 42 formed on the upper sides of the objective lens housing 21. These posts 42 stop the viewfinder cap in its erected position as shown in FIG. 3.

Comparing FIGS. 3 and 9, the guide slot 41 is preferably formed with a slightly re-entrant portion 43 at its extremity which receives the guide post such as 42 in the erected position of the viewfinder shown in FIG. 3. This arrangement acts as a slightly over center detent which requires somewhat more force to overcome when the viewfinder is collapsed toward the folded position shown in FIG. 5 from the position shown in FIG. 3 than the spring 26 exerts in erecting the viewfinder.

It will be apparent that by the arrangement so far described, when the viewfinder is folded to the position shown in FIG. 5, it is there held by the latch elements 24 on the objective lens housing 21 and 25 on the arm 19. The viewfinder may be erected by grasping the viewfinder ca at its rear sides, as indicated at 44 in FIG. 1, and raising it to release the detent catch 25, 24. The viewfinder will then come up into the position shown in FIG. 3 under the influence of the spring 26 and with the additional holding force provided by the detent 42, 43 described in connection with FIG. 9.

As suggested in FIG. 1, the upper side of the viewfinder cap 13 is provided at its forward end with a slot 47 defining the entrance of a socket adapted to receive the blade 48 of a conventional flash array 49. The flash array 49 may be of the conventional variety having five flashlamps on each side, and seven terminals on each side of the blade 48. One of these seven terminals is a wide terminal adapted to bridge two contacts in the camera socket and thereby convert the camera to a flash mode of operation. Another of the seven terminals is a common power supply terminal, and the remaining five are selectively energized at times by a conventional flash firing circuit to select one of the flashlamps in the array for firing.

As best seen in FIG. 8, there are eight corresponding contacts accessible within the slot 47, towards the front of the camera which would be at the top in FIG. 8, Two of these contacts 50 are arranged to be bridged by the wide terminal on the blade 48 referred to above, and the remainder of the terminals 51 serve to connect to the corresponding narrow terminals on the blade 48 for the purposes just described.

Comparing FIGS. 3, 7 and 8, the slot 47 communicates with a socket generally designated 52 and molded into or otherwise formed integrally with the viewfinder cap 13. The contacts 50 and 51 are mounted on a suitable conventional molded plug 53, of plastic or the like, which fits into the socket 52 and which holds the contacts 50 and 51 in spaced insulated relationship. The plug 53 may be molded of any convenient plastic or the like.

The contacts 50 and 51 are connected to control circuits in the camera over a conventional flexible conductor strip 54 or the like, which comprises any convenient insulating plastic in which there is embedded a series of flat copper conducting strips, not shown. The conductor strip 54 is led up over the plug 53 by a plug retainer clip 55, shown in FIGS. 3 and 6. The plug retainer clip 55 comprises a top flange portion 56 bent over at the ends to form ears 57 that are secured to suitable posts 58 molded integral with the viewfinder cap 13 by means such as a pair of screws 59. The plug retainer clip 55 is folded over as shown at 60 and relieved with a slot as indicated at 61 to allow the flexible conductor strip 54 to be bent at a more gradual radius.

As indicated in FIG. 3, the strip 54 passes up against the top of the viewfinder cap 13, where it is retained by means such as posts 62, formed integral with the viewfinder cap on either side of the strip 54. The posts 62 are formed with slots 69 (FIG. 5) to receive the edges of the flexible strip 54.

Between the posts 62 and the clip 55, there is preferably located the flash firing circuit for the camera comprising an integrated circuit indicated at 63. This may be the flash firing circuit used in the Polaroid SX-70 Land camera, or any other suitable switching apparatus for selectively firing each of the five bulbs in the flashlamps in one side of an array. Basically, in practice it would comprise five silicon controlled rectifiers and control circuits for selectively using each of these controlled rectifiers as a switch for firing a different one of the flashlamps. Its location near the socket is necessary to avoid multiple firing, for reasons which are beyond the scope of this description; for present purposes, it is only desired to point out that the attempt to carry this portion of the circuit down into the camera would result in difficulties.

The flexible conductor strip 54 passes to the rear of the viewfinder cap 13, and then downwardly to a junction with a corresponding strip 65, to which its several leads can be soldered in a conventional manner. Location of a soldered junction here facilitates manufacture of the apparatus. The conductor strip 65 passes down into communication with the camera control circuits, not shown, through an aperture 67 on the top panel 7 which is light-shielded from the exposure chamber described above.

Located in a suitable recess 64 in the socket 52 is a projecting resilient friction tab 66, as best shown in FIGS. 3, 7 and 8, which is adapted to engage the blade 48 of a flash array 49. As indicated in FIG. 8, the tab 66 is preferably provided with a central recessed portion 68 so that the blade is engaged at two spaced points to distribute the force applied. The action of the friction tab 66 is suggested with gross exaggeration in FIG. 7, it being apparent that as the blade 48 is inserted, it will first be engaged by the tab 66, and then be engaged by the contacts such as 51 so that there will be a net force urging the blade 48 against the forward edge of the slot 47 and serving to hold the flash array 49 securely in the socket. It will be apparent that the principal additional gripping force provided is divided between the eight contacts 50, 51 and the left side of the entrance slot 47 as seen in FIG. 7, so that no great additional pressure on the contacts 50 and 51 is introduced. It will be apparent that by this arrangement considerable additional gripping force can be provided without requiring a closer fit between the slot 47 and the blade 48 than is conveniently attained in production.

In the operation of the apparatus just described, when the camera of FIG. 1 is in its erected position, an operator may insert a flash array 49 by grasping it and pushing it down with the blade inserted into the slot 47. Force required for this purpose will overcome both the detent action supplied by the over-center form of the slot 41 described above, and the spring 26. The viewfinder cap 14 will go down into its collapsed position under the influence of this force, but a force applied to the receptacle end 45 of the viewfinder cap 13 will not be effective to collapse the eyepiece linkage. Thus, the viewfinder will not be latched into its collapsed position.

As the blade 48 of the flash array 49 goes down into the socket, it will first engage the tab 66, and next engage the contacts 50 and 51. When the viewfinder cap is then released, the viewfinder will come into its erect position, lifting the flash array 49 into operative position. As the viewfinder cap flies up into this position, the tab 66 will effectively prevent the flash array 49 from being ejected accidentally.

Referring to FIG. 2, it will be noted that there are framing marks 70 on the face of the objective lens 32, which may be formed during the molding of the lens from suitable plastic; for example, polystyrene. These marks are to aid the user in framing close objects, to correct for parallax and image size. In using the apparatus with the flash array 49, if the user will tip the viewfinder cap down by pushing against the top 45 of the flash receptacle, until the bottom of the viewfinder cap reaches the framing marks as seen in FIG. 2, the camera will both be framed correctly for a close-up, and the flash array 49 in FIG. 1 will be tipped appropriately to direct it more nearly to the center of the picture.

While the invention has been described with reference to the details of a particular embodiment thereof, many changes and variations will occur to those skilled in the art upon reading this description, and such can obviously be made without departing from the scope of the invention.

Having thus described the invention, what is claimed is:

1. A camera for use with a flash array of the type including a connection blade having terminals on at least one side thereof, said camera comprising:
   a camera housing;
   a viewfinder mounted on said camera housing for movement between collapsed and erected positions and including a viewfinder cap pivotally mounted near one end thereof for pivotal movement between collapsed and erected positions and a spring for urging said viewfinder cap into its erected position, said viewfinder cap including means for defining a socket in said viewfinder cap near an end thereof opposite said one end, and means for defining a slot in said viewfinder cap communicating with said socket and through which the blade of such a flash array is adapted to be inserted into said socket;
   a set of contacts located in said socket near one side thereof and positioned therein for engaging the terminals on the one side of the blade of such a flash array inserted into said socket through said slot; and a resilient friction tab mounted in said viewfinder cap so as to project into said socket from a side thereof opposite said one side and being flexible in the directions of the movement of the flash array connection blade as it is inserted into and removed from said socket and including a blade engaging end for engaging the opposite side of the blade from the side having the terminals thereon in engagement with said contacts and for urging the blade towards said contacts to increase the gripping force on the blade thereby preventing the blade from being ejected from said socket when said viewfinder cap is erected under the influence of said spring.

2. A camera as defined in claim 1 wherein said blade engaging end has a recessed central portion such that portions of said end outboard of said central portion engage the opposite side of the blade at two spaced points thereon.

3. A camera as defined in claim 1 wherein said contacts and said resilient friction tab are positioned in said socket out of direct alignment with one another so in combination they impart a turning moment to the blade located in said socket.

4. A camera for use with a flash array of the type including a connection blade having terminals on at least one side thereof, said camera comprising:

a camera housing;

a viewfinder mounted on said camera housing for movement between collapsed and erected positions and including a viewfinder cap pivotally mounted near one end thereof for pivotal movement between collapsed and erected positions and a spring for urging the viewfinder into its erected position, said viewfinder cap including a socket within said viewfinder cap near an end thereof opposite said one end, and means for defining a slot in said viewfinder cap communicating with said socket and through which the blade of such a flash array is adapted to be inserted into said socket;

a plug of insulating material having a set of contacts thereon adapted to engage the terminals on one side of the blade of such a flash array, said plug being configured to be located within said socket with said set of contacts thereon positioned near one side of said socket to engage such terminals;

a plug retaining clip for retaining said plug in its position within said socket, said plug retaining clip being bent over at its ends to form securing ears;

a pair of posts within said viewfinder cap to which said securing ears are attached for securing said retaining clip to said viewfinder cap, said viewfinder cap and said posts being formed as an integrally molded structure; and a resilient friction tab mounted in said viewfinder cap and extending into said socket from a side thereof opposite said one side for engaging the opposite side of the blade to urge said blade towards said contacts thereby increasing the gripping force on the blade to prevent its ejection from the socket when said viewfinder cap is urged into its erected position under the influence of said spring.

* * * * *